United States Patent [19]

Bezzerides et al.

[11] 4,033,270
[45] July 5, 1977

[54] AGRICULTURAL SOIL CHEMICAL INCORPORATOR

[76] Inventors: Paul A. Bezzerides, 14092 Ave. 416; Robert A. Bezzerides, 14142 Ave. 416; Dave W. Vradenburg, 14092 Ave. 416, all of Orosi, Calif.

[22] Filed: May 19, 1975

[21] Appl. No.: 578,485

[52] U.S. Cl. .................................. 111/6; 111/10; 172/540; 172/555; 172/574; 172/595
[51] Int. Cl.² .................. A01C 23/00; A01B 35/16
[58] Field of Search .......... 172/440, 441, 540, 555, 172/556, 574, 576, 595, 581, 605, 582, 512; 111/10, 6

[56] References Cited

UNITED STATES PATENTS

| | | | |
|---|---|---|---|
| 510,266 | 12/1893 | Keizer | 172/556 |
| 1,171,960 | 2/1916 | Kelly | 111/10 |
| 1,225,233 | 5/1917 | Ford | 172/512 X |
| 1,844,255 | 2/1932 | Kaupke | 172/556 X |
| 2,335,156 | 11/1943 | McMahon | 172/441 X |
| 2,336,848 | 12/1943 | Cruse | 172/440 |
| 2,352,963 | 7/1944 | McMahon | 172/441 X |
| 2,420,437 | 5/1947 | McMahon | 172/574 X |
| 2,691,933 | 10/1954 | Emerson | 172/555 X |
| 2,729,929 | 1/1956 | Mason | 172/579 |
| 3,194,194 | 7/1965 | Phelps | 111/10 X |

FOREIGN PATENTS OR APPLICATIONS

| | | | |
|---|---|---|---|
| 249,297 | 6/1947 | Switzerland | 172/540 |
| 1,090,048 | 11/1967 | United Kingdom | 172/540 |

*Primary Examiner*—Paul E. Shapiro
*Attorney, Agent, or Firm*—Vergil L. Gerard

[57] ABSTRACT

Disclosed is a farm implement for incorporating chemicals sprayed on top of soil into a predetermined depth of the soil. The incorporator implement consists of a frame adapted to be suspended on a three point suspension mechanism of a tractor and two gangs of ground driven incorporator spiders, one in front of another. Each gang includes a forward row and a rearward row of the spiders with the forward row angled acutely to one side of the direction of travel of the implement and the rearward row angled acutely to the opposite side. In a second form we utilize gangs of incorporator spiders for post emergence chemical incorporation by arranging the incorporator spiders to work between the rows of plants and providing shield troughs for the plants. In a third form we utilize gangs of incorporator spiders disposed normal to the sloped banks of a narrow, single row, plant bed for post emergence incorporation.

14 Claims, 14 Drawing Figures

AGRICULTURAL SOIL CHEMICAL INCORPORATOR

BACKGROUND OF INVENTION

This invention relates generally to farm implements more particularly to implements for incorporating surface sprayed soil chemicals into a specified depth of the soil, by mixing. In modern farming practices surface sprayed soil chemicals are used for a variety of purposes but principly as weed killers or herbicides, to incorporate these chemicals into the soil for a specified depth in order for them to be truly effective. In preparing seedbeds for row crops, farmers now frequently incorporate into the top soil shortly before planting, herbicides which can be tolerated by the plant but not by the principle weeds which compete with it. In this type of incorporation, the chemical is put into the seedbed soil evenly.

After planting has occured and the plants have emerged and begun their early growth, additional herbicides are frequently incorporated into the soil, but in this post emergence condition, incorporation must be done only between the rows of growing plants.

A number of different implements have been devised for incorporating surface sprayed soil chemicals into the top soil, the most widely used of which is the power incorporator. In this device, mulching blades are power driven at a rate faster than the rate of travel of the implement and chemical, sprayed on top of the soil ahead of the implement, is stirred into the soil in this manner.

The principal disadvantage of the power incorporator and other presently known devices for incorporating chemicals into the soil is that they stir the soil at least twice as deep as the desired level of incorporation. That is, where a 2 inch depth of incorporation is desired, the power incorporator and similar devices must dig to a depth of at least 4 inches to accomplish this. This means that the seed bed is soften to a greater depth than is frequently desirable. It also generally results in the use of additional chemical since the chemical is spread over more than merely the desired 2 inch depth and frequently is more unevenly distributed than is desired. Moreover, the power incorporator is expensive to build and operate. A need therefore exists for a reasonable simple, inexpensive farm implement which can incorporate surface sprayed chemical into the soil by working no more of the soil than the desired depth of incorporation. It is therefore a major object of my invention to provide a soil chemical incorporator which incorporates the surface sprayed chemicals into the soil by working the soil only to the depth of the desired incorporation.

It is another important object of my invention to provide an incorporator of the type described in which the incorporator spiders are ground driven rather than power driven and which is therefore considerably less complex and expensive than power driven incorporators. It is a further object of my invention to provide an incorporator of the type described which utilizes gangs of incorporator spiders, each gang consisting of a front line of spiders disposed at an acute angle to one side of the direction of travel and a rear line of spiders disposed at an acute angle to the other side of the direction of travel and aligned to catch the dispensed by the front line of spiders. It is still another object of my invention to provide an incorporator spider having a plurality of radial arms with incorporator blades on their distilled ends.

It is still a further object of my invention to provide an incorporator of the type described which can be assembled with a tractor on a three point suspension hitch in the same manner as a gang of disc blades.

These and other objects and advantages of my invention will become more readily apparent from the following detailed description of a preferred embodiment, when read together with the accompanying drawings in which.

DETAILED DESCRIPTION OF PARTS

Figures 1, 2:
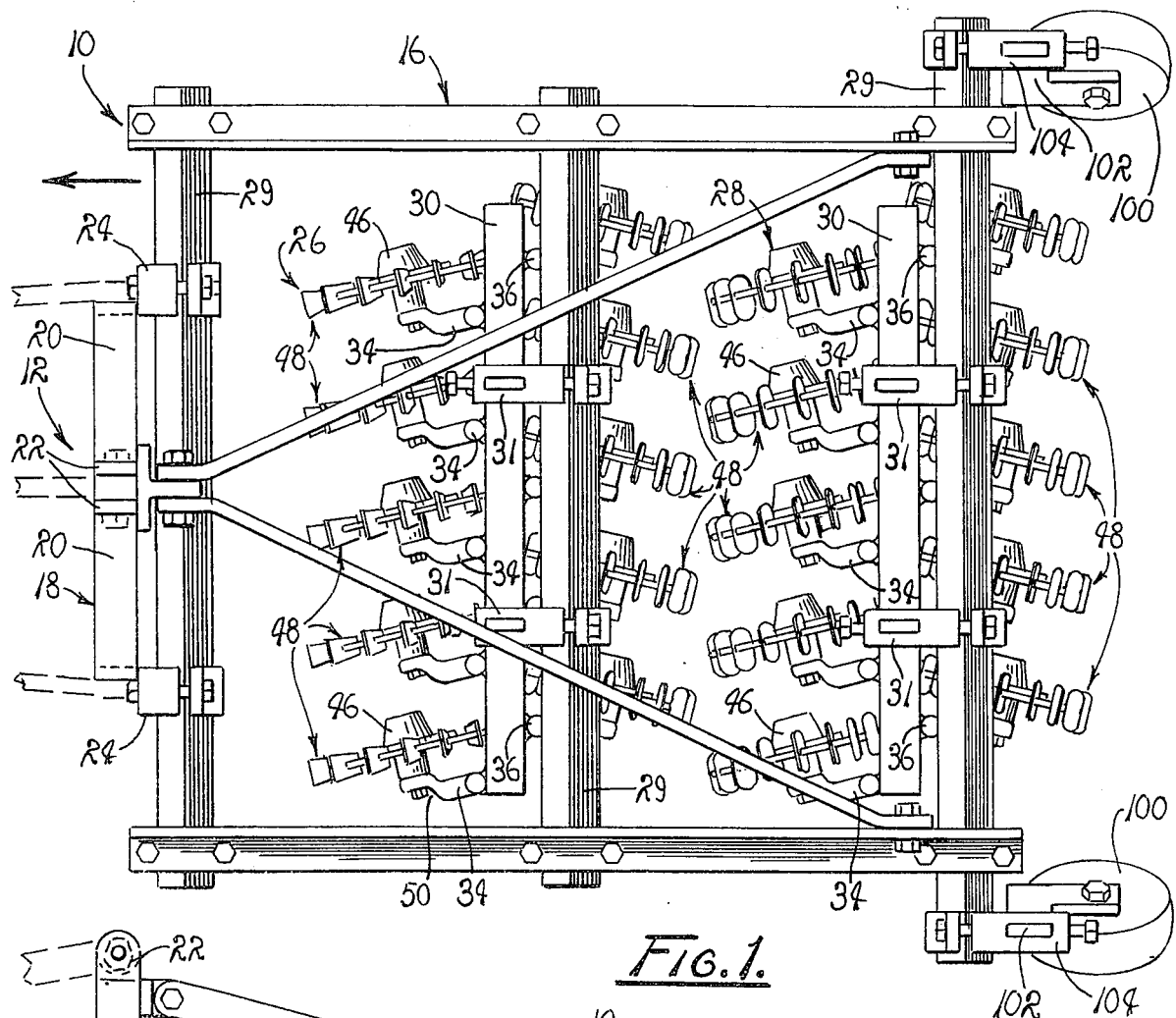
FIG. 1 is a plan view of a preferred embodiment of my invention shown mounted on the three point suspension mounting of a tractor.
FIG. 2 is a side elevational view of the preferred embodiment shown in FIG. 1.

Referring now to the drawing in particularly FIGS. 1 through 4 thereof, my incorporator implement is designated generally by the numeral 10. The incorporator implement 10 is mounted on a tractor by means of a three point suspension mounting 12. The incorporator implement 10 has a frame 16 with an upstanding connector member 18 supported by diagonal brace 20. On top of the upstanding connector member 18 is a coupling 22 which connects to the upper part of the three point tractor suspension 12. On the sides of the frame 16 at the front, are lateral connector couplings 24. These couplings 24 connect the incorporator frame to the side connectors of the three point tractor suspension 14. Thus the interconnection between the incorporator implement 10 and the three point suspension 14 on the tractor is accomplished in the manner well known in the art.

Two gangs of incorporator spiders, a front gang 26 and a rear gang 28, are mounted on laterals 29 of the frame 16.

As best shown in FIGS. 1 and 2, each of the gangs 26 and 28 have a collector bar 3 connected to the frame 16 by a pair of bar clamps 3. Depending from the collector bar 30 are five parts of spider mounting arms 32, each pair consisting of a forward mounting arm 34 and a rearward mounting arm 36. The mounting arms of each pair 32 have their proximal ends 38 attached on opposite sides of the collector bar 30. The forward mounting arms 36 curve forwardly and the rearward mounting arms 38 curve rearwardly, as they depend to their distal ends 42.

At the distal ends 42 the mounting arms 36 and 38 each have a bore 44 for mounting the hub 46 of an incorporator spider 48. To provide clearance for rotation of the incorporator spider 48 mounted thereon, each of the mounting arms 36 and 38 have a lateral offset 50. Also, the distal ends 42 of the forward mounting arm 36 and the rearward mounting arm 38 of each pair are spaced apart longitudinally a distance sufficient to provide clearance between the rearward portions of the incorporator spider 48 mounted on the forward mounting arm and forward portions of the incorporator spider 48 mounted on the rearward mounting arm 38.

The incorporator spiders 48 mounted on each pair 32 of the mounting arms are best shown in FIGS. 5 through 8. The hub 46 of each of these incorporator spiders 48 has a flange 54 which fits in a center hole 56 in the face 58 of the spider and attaches to portions of the face surrounding the center hole. A hub shaft 60 is attached to the hub flange 54 and extends through the center hole 56 and projects axially outwardly of the spider on the opposite side (see FIG. 6). The hub shaft 60 has a bushed and threaded portion 62 at its distal end and a shoulder 64 adjacent said portion so that it mounts in bore 44 of the mounting arms 36 and 38 with the shoulder 64 abutting one end of the bore and a nut and washer 66 on the threaded portion 62 abutting the other end of the bore.

The incorporator spiders 48 each have curved arms 68 which spiral radially outward from the face 58 and have blades 70 affixed to their distal portions. Two forms of blades 70 are used on the spiders. The first form is the cutting blade 72 which has the shape of an elongated trapezoid (see FIGS. 5 and 6). It is narrowest at its inner end 74 where it attaches to the distal ends of the spider arms 68 and widens as it extends radially outward therefrom to its outer end 76. The outer end 76 is relatively sharp and provides a cutting edge capable of slicing through thin crusts on the soil.

Figure 7:
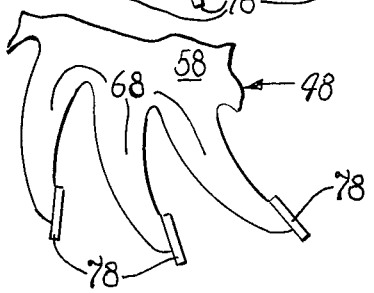
FIG. 7 is a partial elevational view of the incorporator spider showing a modified incorporator blade.
Figure 8:
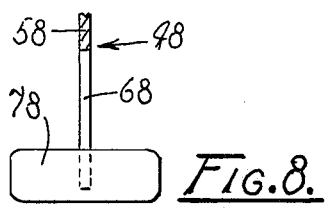
FIG. 8 is a partial end view of the spider and blade in FIG. 7.

The second form of spider blade is the spade blade 78, best shown in FIGS. 7 and 8. The spade blade 78 is generally rectangular and is mounted on the distal end of the spider arms 68 with its widest dimension disposed axially. Its narrower dimension is thus radially disposed and is considerably shorter than the radial dimension of the cutting blade 72.

Figure 9:
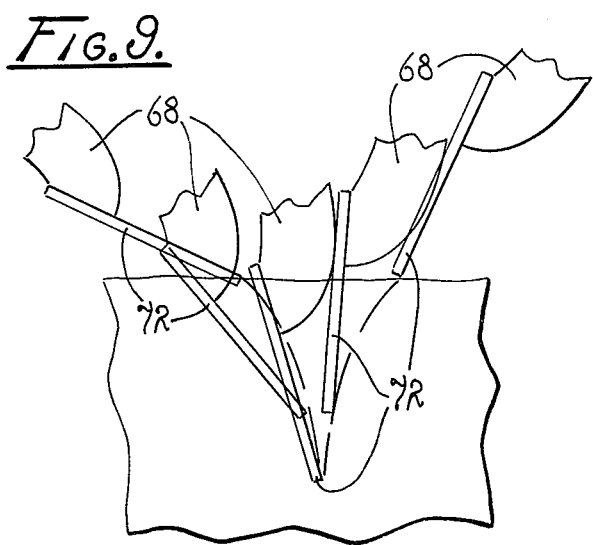
FIG. 9 is an illustrative elevational view showing the engagement of the incorporator spider and blade with the ground when the spider is drawn through the soil in a first direction.
Figure 10:
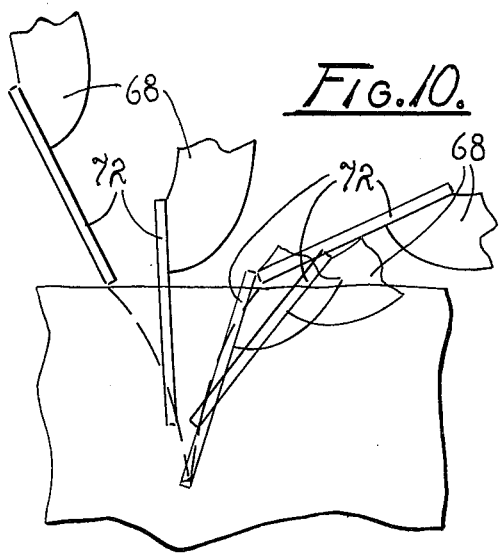
FIG. 10 is an illustrative elevational view showing the engagement of the incorporator spider and blade with the ground when the spider is drawn through the soil in the opposite direction to that in FIG. 9.

In addition to having two types of blades, the incorporator spiders 48 have the ability to provide different results depending on the manner in which they are passed through the soil. As best shown in FIGS. 9 and 10, the spiders 48 may be mounted on the mounting arms 36 and 38 so that they passed through the soil with the blades 70 in a trailing position with respect to the spider arms 68 (see FIG. 9), or reversed on their mountings and passed through the soil with their blades in a leading position with respect to the spider arms 68 (see FIG. 10). As FIGS. 9 and 10 illustrate, when the spiders 48 are passed through the soil in a blades trailing condition (FIG. 9) the blade first enters the soil in a nearly upright condition (position 1), is driven down in a puncturing motion as it reaches vertical (position 2), tends to spade up the soil as it moves past vertical (positions 3 and 4), and leaves the soil in a near horizontal condition (position 5). When the spiders 48 are passed through the soil in a blades leading condition (FIG. 10,) the blade first enters the soil in a nearly horizontal condition (position 1) tends to press or crush the soil as it moves past the vertical condition (positions 2, 3 and 4) and leaves the soil just past the vertical position (position 5) causing more of a packing rather than a spading action.

From this description, it will also be understood that as the implement 10 is moved over the ground with the spiders 48 in a ground engaging position, the engagement of the blades 70 with the ground rotates the spiders 48, like paddle wheels, on their hub shaft 60.

Figure 4:
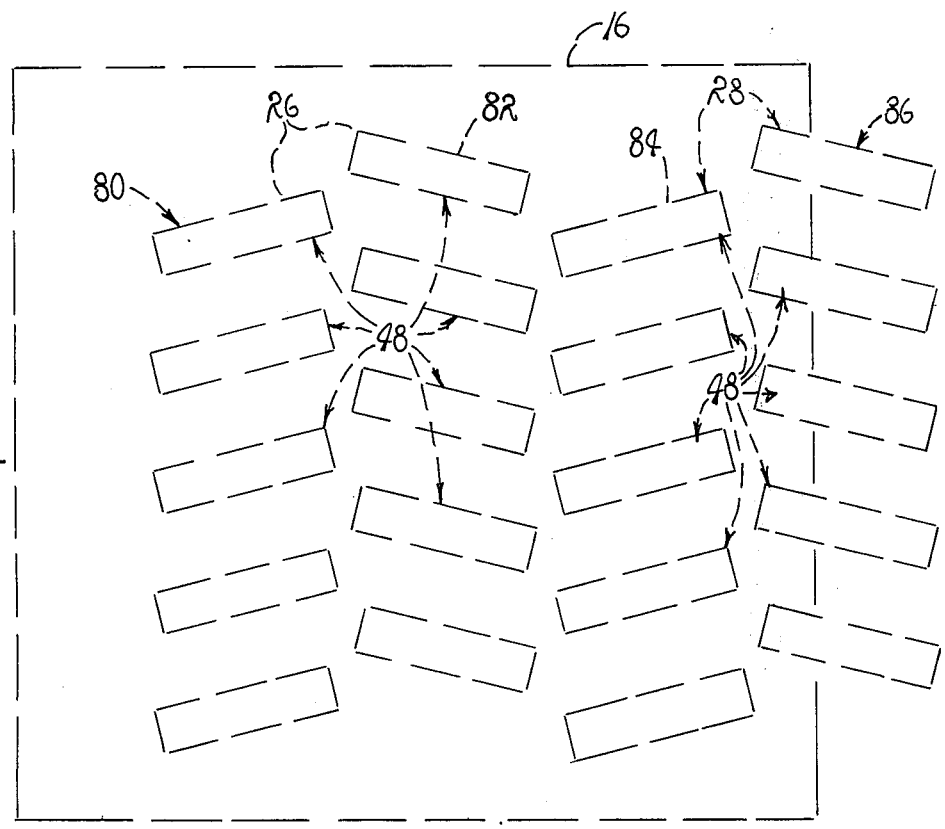
FIG. 4 is a schematic plan view showing the relative positions of the incorporator spiders.
Figure 5:
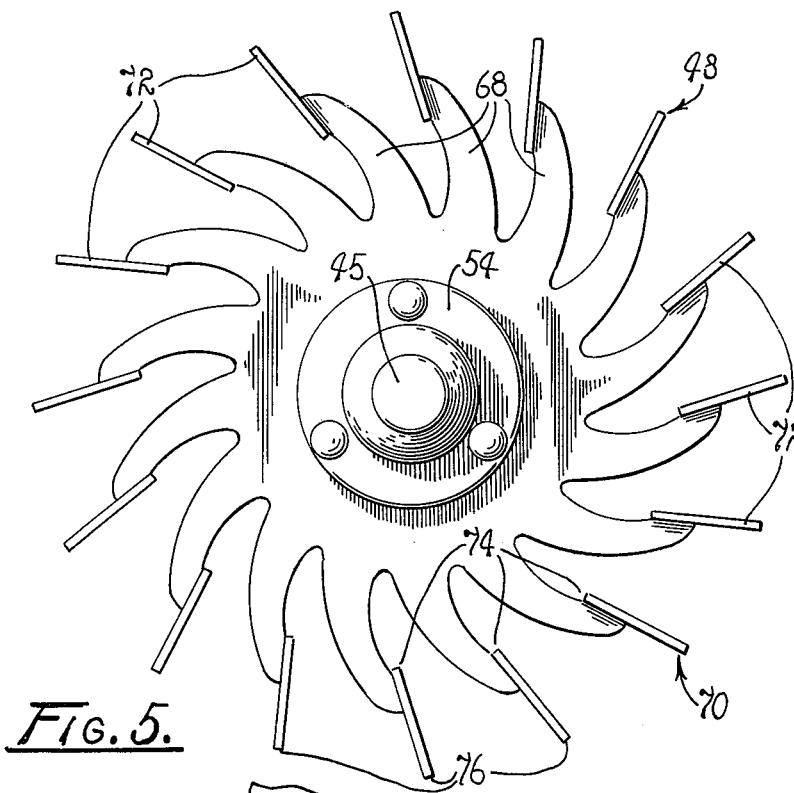
FIG. 5 is a side elevational view of a preferred embodiment of the incorporator spider utilized in our invention.
Figure 6:
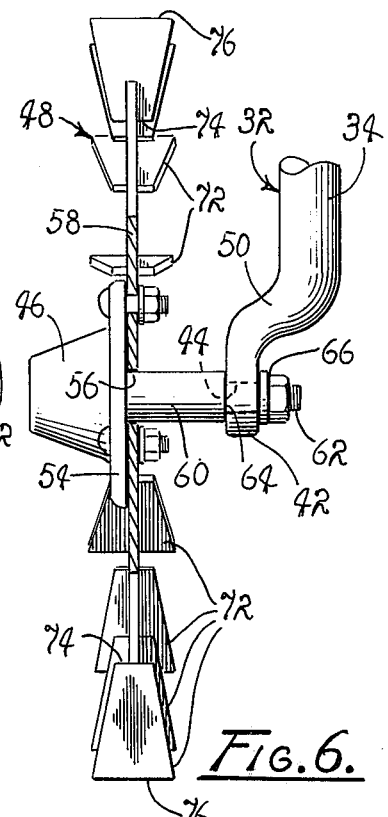
FIG. 6 is an end view of the incorporators spiders shown in FIG. 5.

As best shown in FIGS. 1 and 4, further action on the soil by the incorporating spiders 48 is caused by the angular disposition of the spiders to the line of travel of the implement. The front gang 26 has a forward line 8 of spiders 48 and a rear line 82. The incorporator spiders in the front line 80 are disposed parallel to one another but at an angle of about fifteen degrees to the left side of the direction of travel. The incorporators in the rear line 82 are likewise disposed parallel to one another and are positioned at an angle of about fifteen degrees to the right side of the direction of travel. Moreover, the rear line 82 is offset laterally to the right of the front line 80 so that the forward portion of each spider 48 in the rear line is slightly to the right of the rearward portion of its corresponding spider in the front line. With the incorporator spiders 48 thus positioned, the soil manipulated by each front line spider is disposed toward the right side of the implements line of travel and in alignment for further manipulation by each corresponding rear line spider, which then disposes the soil toward the left side of the implement and back to substantially the original position before the passing of the gang.

The rear gang 28 has a front line 84 of incorporator spiders 48, disposed parallel to one another and at an angle to one side of the line of travel similar to the forward line 80 of the front gang 26, and a rear line 86 parallel spiders disposed at an angle to the opposite side of the line of travel similar to the rear line 82 of the front gang.

The front gang 26 and the rear gang 28 are so positioned relative to one another, that the forward position of the front line spiders in the rear gang 28 are disposed to engage and manipulate soil delivered from the rearward portions of the rear line spiders in the front gang 26. As will be understood from FIGS. 1 and 3, the rear gang 28 therefore reworks the same soil worked by the front gang 26 in substantially the same manner. Thus, following the line of travel of the implement soil engaged by a spider 48 in the front line 80 of the front gang 26 will be worked to the left by the front line, returned to the right by the rear line 82 of the front gang, worked to the left again by the front line 84 of the rear gang 28, and returned to the right again by the rear line 86.

Where it is desirable to use the implement 10 to work a seed bed wider than the width of the front gang 26, the rear gang can be offset laterally a distance equal to the lateral spacing between one or more of the spiders in front line 84. The spiders 48 in that portion of the rear gang 28 with laterally overlaps the front gang 26 then will still have the same relative position, and the only loss will be the double gang working of the soil on the shoulders of the seed bed where the front gang and rear gang do not overlap. Generally, a gang of five incorporator spiders is made 36 inches wide and by using two gangs in offset position a bed 42 inches wide can be worked quite adequately.

The incorporator implement 10 shown in FIGS. 1 through 10, is used to incorporate chemical sprayed on the soil surface into a multi-plant row seed bed before planting. The chemical to be incorporated is delivered to the soil surface just ahead of the front gang 26 by spray nozzles 90 supplied by nozzle pipes 92 from a header 94. The header 94 is mounted at the front of the implement on the forwardmost frame lateral 29 and supplied from a reservoir tank on the tractor.

From the description of the two forms of the spider blades 70, and the ability to mount the spiders 48 for blade trailing or blade leading operation, it will be understood that great versatility is provided by our implement. In this embodiment, the spiders 48 in the front line 80 of the front gang 26 have cutting blades 72, and all the other spiders in both gangs have spade blades 78. Also, all of the spiders in this embodiment are mounted to work the soil in a blade trailing condition. This is an effective arrangement for medium wight, moderately moist soil with a light crust. The cutting blades 72 on the front line 80 will readily penitrate the crust and the blade trailing condition assure adequate mixing even with heavier somewhat moist soil. If the soil had a ticker crust, more lines of cutting blades could be used. If the soil were lighter and drier, with many small clods, it might be better treated by mounting the spiders of one or more lines in a blade leading condition.

Now that, it is understood that the spiders travel through the soil at an angle to the line of travel, the working of the soil by the blades 70 of the spiders in either a blade trailing or blade leading condition can be further explained. Referring again to FIGS. 9 and 10, if the action of the blades there shown is viewed with the angle of the spider to the line of travel in mind, it will be realized that in the blade trailing condition (FIG. 9) the spider tends to spade up the sub-surface soil and roll it over onto the surface soil containing the chemical spray. In the blade leading condition, (FIG. 10) however, the blade tends to press the chemically sprayed surface soil down into the sub-soil as the soil is rolled over.

In either case, it should be noted that the blade enters the soil surface, penetrates to a specified depth and is then extracted. This action is important to the facility of our implement to work the soil only to the approximate depth of desired chemical incorporation and not to twice that depth as is common with power incorporators.

Figure 3:
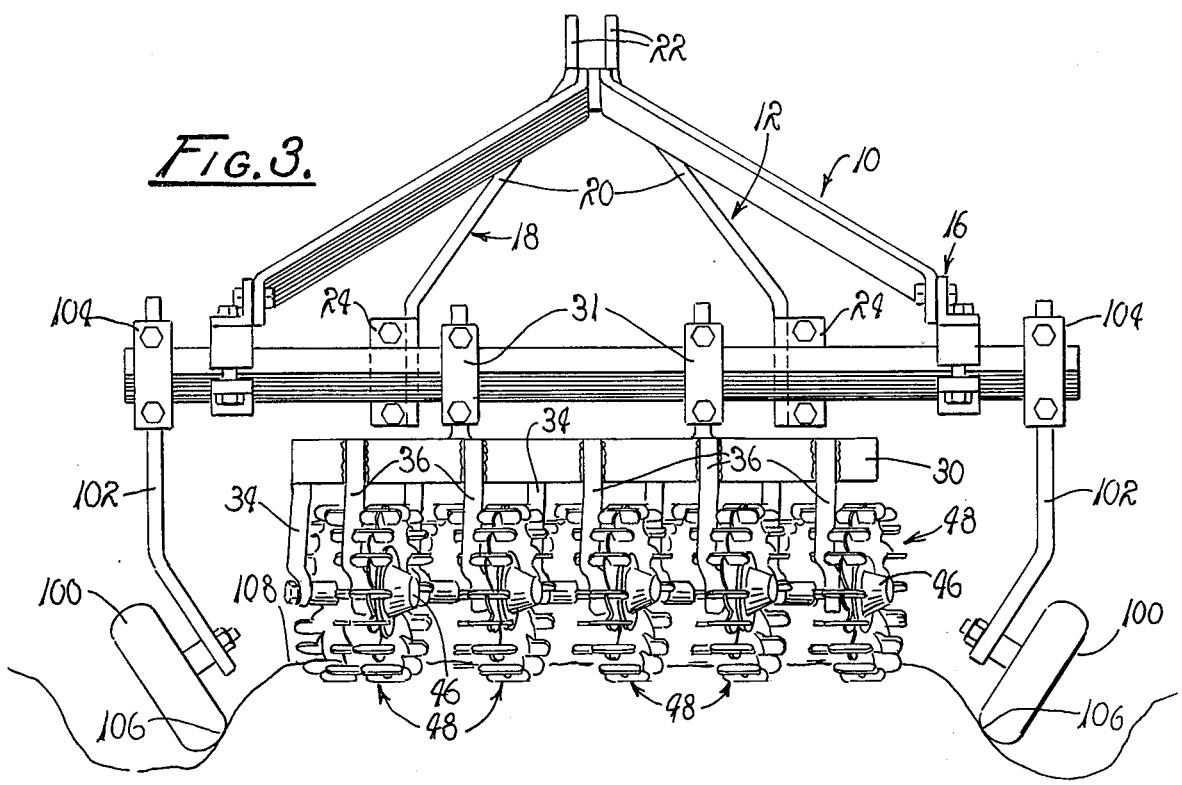
FIG. 3 is an elevational view looking rearward from the tractor.

Although the depth can be reasonably well controlled by regulation of the three point suspension mounting on the tractor, it is advantageous with larger implements such as shown in this embodiment to the additional support of a pair of furrow wheel 100 (see FIG. 3). The furrow wheels are adjustibly mounted at the two rearward corners of the frame 16 on wheel supports 102 which fit telescopically in clamps 104. By proper adjustment of the wheel supports 102, the depth of incorporation can be accurately set and maintained. The furrow wheels 100 are also canted from the vertical so they run to some extent on the sides 106 of the seed bed 108, thereby assuring continuing travel alignment of the implement with the seed bed as well as accurate working depth.

Figure 11:
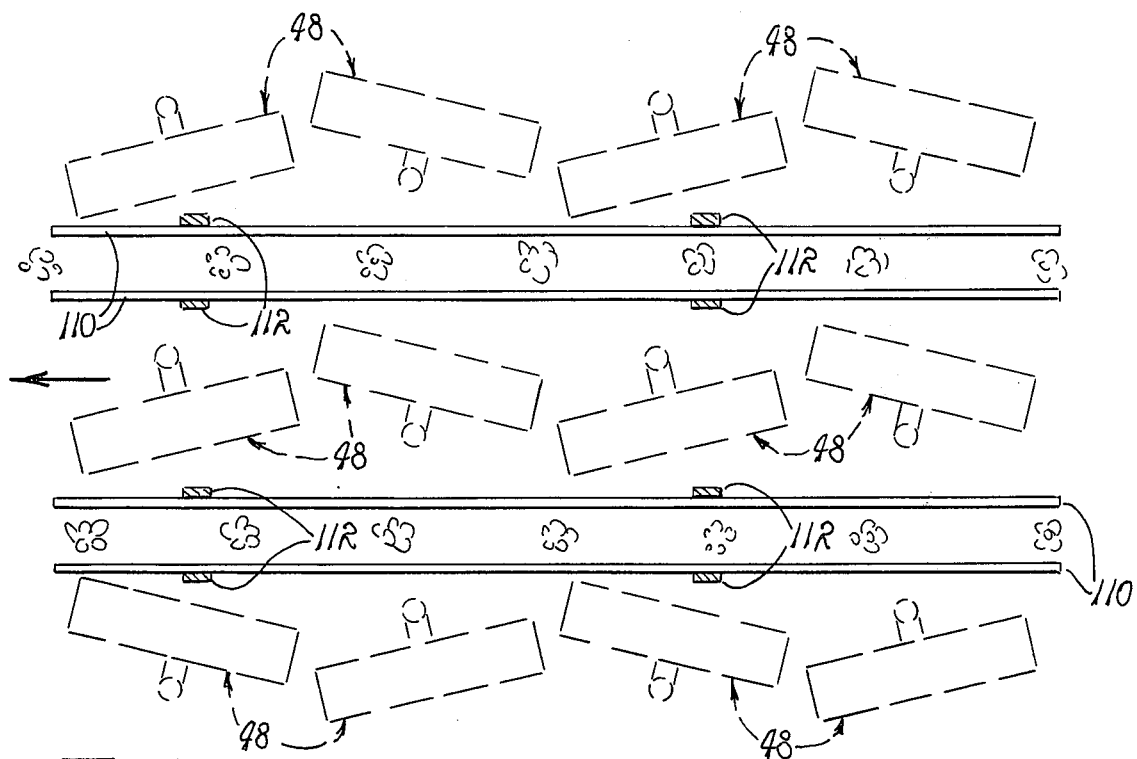
FIG. 11 is a schematic plan view of a second form of my invention adapted for post emergence incorporation in a multi-plant row bed.
Figure 12:
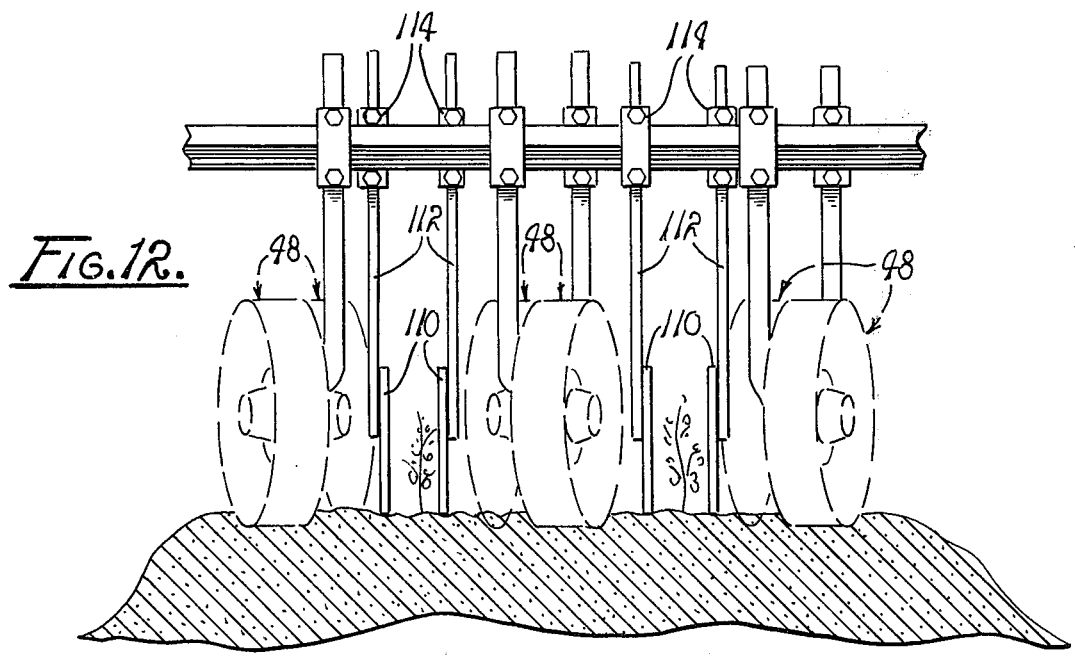
FIG. 12 is a sectional view taken on 12—12 in FIG. 11.

In FIGS. 11 and 12, a modified form of the invention is shown. In this form, the spiders are spaced in the gangs to permit post emergence incorporation. That is, incorporation of soil chemicals after the seed bed has been planted and the plants have emerged.

To accomplish this function it is only necessary to arrange the spiders in the front and rear gangs 26 and 28 to provide channels for the plant rows. This can be done by shifting the spider mounting arms 32 laterally on the collect bar 30 of each gang. After the channels have been provided for the plant rows, a pair of plant shields 110 are mounted on the frame 16 by shield support arms 112 and shield support clamps 114. Since the shield support arms 112 are adjustibly mounted to the frame 16 by the shield support clamps 114, the height and alignment of the shields can be easily regulated. The shields prevent the soil discharged from the spiders in the direction of the plants from reaching and covering the plants, and can be adjusted to protect the plants from the chemicals as they are sprayed on the soil surface.

Figure 13:
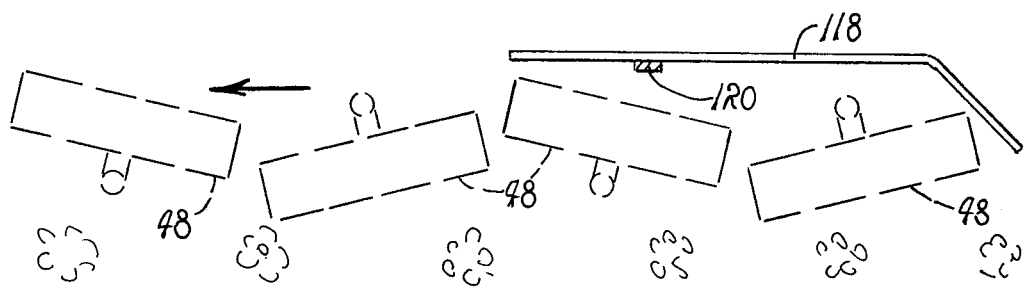
FIG. 13 is a schematic plan view of a third form of our invention showing the incorporator arranged for pre-emergence incorporation in a single plant row bed.

In FIG. 13, another arrangement of the incorporator spiders in the frame 16 is shown. The purpose of this arrangement is to provide pre-planting incorporation of a narrow seed bed such as a ten inch cotton seed bed. The incorporator spiders 48 are adjusted laterally to align one fore and aft series of spiders with each row. To prevent soil discharged from the spider in the rear line 86 of the rear gang from falling into the adjacent furrow, a deflector 118 is mounted on the frame 16 by a deflector support 120 which is adjustably clamped to one of the frame laterals 29, permitting easy regulation of the deflector position.

Figure 14:
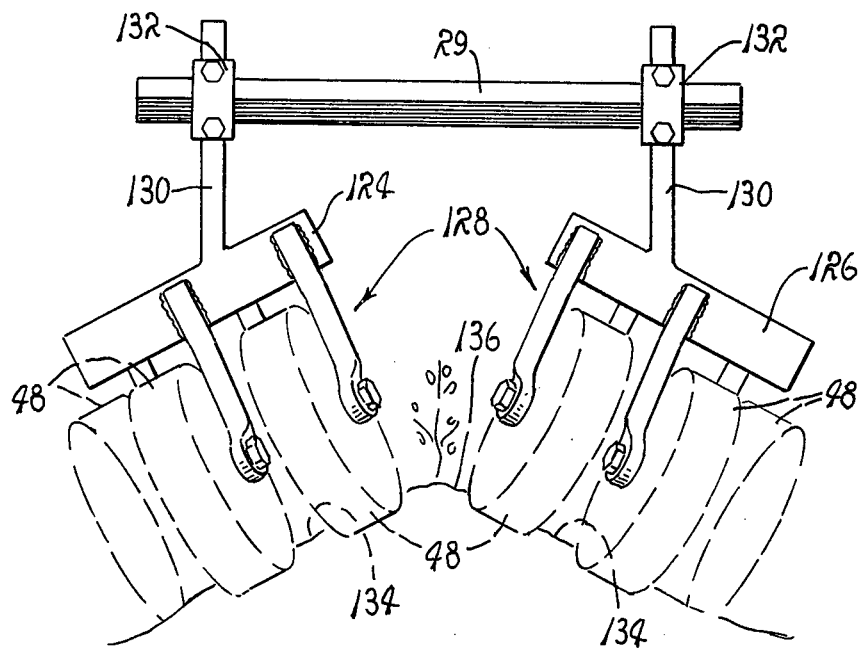
FIG. 14 is an elevational view of a fourth form of our invention showing the incorporator spiders disposed normal to the sloping banks of a single plant row bed for post emergence incorporation.

In FIG. 14, still another arrangement of the incorporator spiders is shown. In this arrangement the collector bar 30 is split into sectional collector bars 124 and 126 each of which contain a split gang 128 of incorporator spiders 48. The sectional collector bars 124 and 126 each have a mounting support 130 which is adjustibly mounted on a frame lateral 29 by clamps 132. The sectional collector bars 124 and 126 are disposed to form an acute angle with their respective mounting supports 130 so that they are generally parallel to the sloped sides 134 of a narrow single plant row seed bed 138. The slit gangs 128 are laterally spaced apart to position them over the sloped seed bed sides and their height is so regulated by adjustment of the mounting supports that they work the slope sides 134 to the desired depth of incorporation.

This arrangement of the implement 10 is used for post-emergence incorporation in a narrow seed bed such as a three inch cotton seed bed.

From this description of the parts and operation of preferred embodiments of our invention it should be understood that it is fully capable of achieving the objects and providing the advantages heretofore attributed to it. Its facility for various arrangements of the gangs of incorporator spiders permits wide latitude in its use, including wide seed beds and narrow, and pre-planting as well as post emergence incorporation. This coupled with the variations possible by use of cutting blades or spade blades, and the blade trailing or blade leading spider mounting, make our implement a highly versatile device.

Furthermore, it should be understood that our implement overcomes the principal disadvantages present in power incorporators in that it is ground driven and works the soil only to the approximate depth of incorporation.

I claim:

1. A soil chemical incorporator implement comprising:
    a frame disposed to pass over a soil surface along a particular path of travel and having a forward position which leads said frame along said path of travel, a rearward portion which trails said frame along said path of travel, and a pair of oppositely disposed side portions which interconnect said forward portion and said rearward portion and define the lateral limits of said frame;
    ground working spider wheel means including a plurality of spider wheels each having a hub, a disc portion surrounding and extending radially outward from said hub, and a plurality of equally spaced arms extending radially outward from the periphery of said disc portion coplanar therewith and having soil engaging blades on their distal ends disposed normal to the plane of said spider wheel disc portion;
    mounting means interconnected between said frame and said spider wheel means and disposed to rotatably mount the hubs of said spider wheels in ground engaging relationship when said frame passes over soil as aforesaid whereby said disc portions and soil engaging blades on said spider wheels engage said soil surface and each of said spider wheels is rotated thereby about its hub, said mounting means is so disposed that said spider wheels are mounted in pairs having a fore and aft relationship; and
    said mounting means includes a mounting bar disposed normal to said path of travel of said frame and having forward line mounting arm means and rearward line mounting arm means, said forward line mounting arm means having a distal end extending forwardly of said mounting bar in the direction of the path of travel of said frame and having the first spider wheel of a related pair rotatably mounted thereon and disposed in a substantially vertical plane with its leading portion disposed at a first acute angle to the path of travel of said frame in the direction of a first of said frame side portions, and said rearward line mounting arm means having a distal end extending rearwardly of said mounting bar in the path of travel of said frame and having the second spider wheel of a related pair rotatably mounted thereon and disposed in a substantially vertical plane with its leading portion disposed at an acute angle to the path of travel of said frame equal to said first acute angle but in the direction of the other of said frame side portions, said spider wheel on said rearward line mounting arm means having its leading portion disposed rearward and substantially in alignment along said path of travel with the rear portion of said spider wheel of said pair on said forward line mounting arm means.

2. A soil chemical incorporator implement as described in claim 1, in which:
    said spider wheel soil engaging blades are rectangular shaped with their long axis disposed normal to the radial axis of said spider wheel arms.

3. A soil chemical incorporator implement as described in claim 1 in which:
    said ground-engaging wheel means includes a plurality of said related pairs of spider wheels
    said forward line arm means of said mounting means includes a plurality of forward line arms each having their proximal ends attached to a common mounting bar, and their distal ends extending forwardly therefrom with a first spider wheel of different related pairs rotatably mounted thereon, with each of said first spider wheels disposed in parallel spaced relationship with each of the other first spider wheels on said forward line arms and thereby forming a forward line of first spider wheels on said common mounting bar,
    said rearward line arm means of said mounting means includes a plurality of rearward line arms each having their proximal ends attached to said common mounting bar to which the proximal ends of said forward line arms are attached and their distal ends extending rearwardly therefrom and each having a second spider wheel of said different related pairs rotatably mounted thereon, with each of said second spider wheels disposed in parallel spaced relationship with each of the other second spider wheels on said rearward line arms and thereby forming a rearward line of second spider wheels on said common mounting bar, and
    said rearward line arms being of the same number as said forward line arms and so positioned that the spider wheel on each of said rearward line arms is disposed at an acute angle to the path of travel of said frame toward the side of said frame opposite the side toward which said first spider wheels on said forward line arms are disposed and have their leading portions aligned along said path of travel with the trailing portion of a pair related first spider wheel in said forward line.

4. A soil chemical incorporator implement as described in claim 1 in which:
    said forward line arm means of said mounting means includes a pair of forward line arms each having its proximal end attached to a different common mounting bar of a pair of split common mounting bars and its distal end depending forwardly and inwardly therefrom with respect to said frame sides and the other of said forward mounting arms and having a first spider wheel of one of said pairs of related spider wheels rotatably mounted thereon with said spider wheel disposed in a generally vertical but inwardly slanted plane with respect to said frame to dispose said spider wheel normal to a slanted soil surface being engaged and worked thereby; and
    said rearward line arm means of said mounting means includes a pair of rearward line arms each having its proximal end attached to a different one of said pair of split common mounting bars and its distal end depending rearwardly and inwardly therefrom with respect to said frame sides and the other said rearward mounting arms, and having a second spider wheel of one of said pairs of related spider wheels rotatably mounted thereon with said spider wheel disposed in a generally vertical but inwardly slanted plane with respect to said frame to dispose said spider wheel normal to a slanted soil surface being engaged and worked thereby.

5. A soil chemical incorporator implement as described in claim 1, in which:

said spider wheels each have radially extending arms each of which spirals outwardly from said hub and has a concave leading edge and a convex trailing edge; and said mounting means is so disposed that each of said spider wheels is mounted with said trailing convex edge disposed to first engage said soil when said frame passes over said soil as aforesaid.

6. A soil chemical incorporator implement as described in claim 1, in which:

said spider wheel soil engaging blades are trapezoidal shaped with their long axis disposed radially with respect to said spider wheel and their narrowest side disposed adjacent to their point of attachement to the distal portions of said spider wheel arms, and lateral thereto.

7. A soil chemical incorporator implement comprising:

a frame disposed for movement over a field having seed beds formed therein along a path aligned with said seed beds, said frame having a front end, a rear end and a pair of oppositely disposed sides, said frame having attachment points suitable for mounting said implement on a three point suspension mounting of a tractor, and wheel means disposed to support said frame in a ground related condition;

a plurality of spider wheels, each having a central mounting hub, a wheel body extending radially outward from said hub, and a plurality of spokes projecting radially outwardly from said wheel body, and having blade means attached to the distal ends of said spokes;

a plurality of mounting arms, each having a proximal end disposed for interconnection with said frame and a distal end disposed to rotatably mount the hub of one of said spider wheels;

a first spider wheel gang bar attached to said frame and disposed to mount the proximal ends of a pair of said mounting arms with the distal ends of said mounting arms depending therefrom and with a first arm of said pair disposed with its distal end extending forwardly of said gang bar to dispose the spider wheel mounted thereon in a generally vertical plane and at an acute angle to the path of travel of said frame in the direction of a first side thereof, and the second arm of said pair disposed with its distal end extending rearwardly from said gang bar to dispose the spider wheel mounted thereon at an acute angle to the path of travel of said frame in the direction of the other side thereof, with the forward portion of said spider wheel on said second arm being in substantial alignment with the rear portion of the spider wheel on said first arm along the path of travel of said frame; and a soil chemical dispenser disposed in front of said frame ahead of the forwardmost of said spider wheels.

8. A soil chemical incorporator implement as described in claim 7 in which:

a plurality of pairs of said mounting arms are attached to said gang bar in side by side relationship and disposed to form a front line of a plurality of spider wheels disposed in spaced parallel relationship and a rear line of a plurality of spider wheels disposed in spaced parallel relationship, with said front and rear lines of spider wheels extending laterally with respect to the path of travel of said frame over a distance substantially equal to the width of one of said seed beds.

9. A soil chemical incorporator implement of the type described in claim 8 in which:

said implement further includes a second spider wheel gang formed substantially identical to said first gang and mounted on said frame rearward of said first gang and in alignment therewith and with the rear line of spider wheels in said first gang being spaced forwardly of the front line of spider wheels in said second gang by a distance substantially equal to the spacing between the front line of said first gang and the ear line of said first gang.

10. A soil chemical incorporator implement as described in claim 7, in which:

said blade on the spokes of said spider wheels is generally rectangular in shape and mounted with its longer dimension normal to the radial axis of its mounting spoke.

11. A soil chemical incorporator implement of the type described in claim 7, in which:

said first spider wheel gang bar attachment to said frame is adjustable and said pairs of mounting arms are selectively removable and adjustable on said gang bar whereby the lateral coverage of said gang may be adjusted to align with and extend over a particular seed bed.

12. In a soil chemical incorporator implement having a frame movable over a soil sufrace, and ground working wheels mounted on said frame, said ground working wheels comprising:

hub means rotatably mountable upon a shaft;

web means extending outward from said hub, said web including a plurality of radial spokes and having sufficient surface for engagement and rotation of said wheel when said wheel is disposed in a generally perpendicular plane with respect to the soil surface being engaged and worked by said wheel and at an acute angle to the path of travel of said frame;

a plurality of blades mounted on the distal ends of said spokes and disposed to engage and work said ground and rotate said wheel when said frame is moved over said soil surface, as aforesaid; and mounting means mounting said ground working wheels on said frame with said wheels disposed in the aforesaid disposition with respect to said soil surface.

13. Claim 12, in which:

said blades are generally rectangular in shape and are mounted with the longer axis disposed axially with respect to said hub.

14. Claim 12, in which:

said blades are generally trapezoidal in shape and are mounted with the longer axis disposed radially with respect to said hub and the longer side disposed distally with respect to the distal end of said spokes.

* * * * *